United States Patent [19]
Crabb et al.

[11] Patent Number: 5,983,720
[45] Date of Patent: Nov. 16, 1999

[54] REFLECTED LIGHT ROTATION SENSOR

[75] Inventors: Thomas M. Crabb, Middleton; Robert C. Richter, Cambridge, both of Wis.

[73] Assignee: Orbital Technologies Corporation, Madison, Wis.

[21] Appl. No.: 08/759,548

[22] Filed: Dec. 5, 1996

Related U.S. Application Data

[60] Provisional application No. 60/008,268, Dec. 6, 1995.
[51] Int. Cl.$^6$ .............................. G01P 15/08; G01D 5/34
[52] U.S. Cl. ................. 73/514.26; 250/231.13; 356/138
[58] Field of Search ............................ 73/514.26, 514.27, 73/653, 655; 250/227.14, 227.21, 231.13, 231.14, 231.17, 231.18, 236; 356/139.03, 141.01, 138, 139.1; 324/97; 359/876, 877, 212, 273, 221

[56] References Cited

U.S. PATENT DOCUMENTS

| | | |
|---|---|---|
| 3,574,466 | 4/1971 | Peters ................................. 356/139.03 |
| 3,663,795 | 5/1972 | Myer ................................... 219/121.68 |
| 3,697,183 | 10/1972 | Knight et al. ........................... 356/150 |
| 4,560,925 | 12/1985 | Niven et al. .............................. 324/97 |
| 4,684,249 | 8/1987 | Ellis ................................... 356/139.03 |
| 5,266,796 | 11/1993 | Leviton ............................... 250/231.18 |
| 5,329,121 | 7/1994 | Leviton ............................... 250/231.13 |
| 5,331,399 | 7/1994 | Tank et al. .............................. 356/346 |
| 5,426,584 | 6/1995 | Kamimura et al. ................ 364/424.02 |
| 5,483,058 | 1/1996 | Leviton ............................... 250/231.13 |
| 5,571,430 | 11/1996 | Kawasaki et al. ................. 219/121.78 |
| 5,587,787 | 12/1996 | Jager ................................... 356/141.1 |

*Primary Examiner*—Hezron Williams
*Assistant Examiner*—Richard A. Moller

[57] ABSTRACT

A rotation sensor utilizing light reflection and/or refraction techniques including a light source, a light reflecting surface and a reflected light receiving member in which the elements are positioned so that the intensity of light reflected by the reflecting surface and received by the receiving member is unique for each rotational position being measured. The invention also relates to a method utilizing the above sensor.

20 Claims, 3 Drawing Sheets

REFLECTED LIGHT ROTATION SENSOR

This application claims the benefit of Provisional Application Ser. No. 60/008,268 filed Dec. 6, 1995.

BACKGROUND OF THE INVENTION

1. Field of the Invention

The present invention relates generally to a rotation sensor for measuring or detecting rotation or angular orientation between first and second or two or more members. More specifically, the present invention relates to a rotation sensor utilizing light reflection and refraction principles. The present invention also relates to a method for sensing the rotation or angular orientation of a first member relative to a second member.

2. Description of the Prior Art

A variety of rotation sensors are currently available in the art for sensing or measuring relative rotation of a rotatable member. One such rotation sensor is an optical encoder. In such a rotation sensor, a matched light source and a photodetector are provided on the opposite sides of a disk. The disk is attached to a shaft which is in turn mechanically coupled to the device whose rotation is to be measured. The disk is provided with a plurality of apertures which vary in radial position as the disk rotates, enabling light to pass through only at certain radii corresponding to its degree of rotation. Optical encoders are commonly available to provide absolute or incremental angle measurement. Although optical encoder rotation sensors function satisfactorily for certain applications, their use in many applications is limited because of size and weight limitations. They are also sensitive to electromagnetic interference (EMI).

Rotation sensors utilizing electrical resolver technology continue to be used in some aircraft applications. Electrical resolvers rely on mutual induction of electrical coils to convey the rotational position. Rotation sensors using this technology are generally quite massive, are usually less accurate and more expensive than sensors using optical encoders, and are also sensitive to EMI.

Resistive potentiometers are also used in some rotation sensors. The principal limitation of this type of rotation sensor is the limited number of cycles per lifetime, particularly with small sensors. Further, the output of the potentiometer, in most applications, requires shielding. Although normally smaller in size than an optical encoder sensors, they are often less desirable for small volume, critical applications because of unreliability and reduced precision. A further major drawback to potentiometer based sensors, like the others described above, is that the signal is conveyed via a wire; therefore, they are not immune to electromagnetic interference (EMI).

Hall effect rotation sensors involving the rotation or movement of a magnet past a detector are also available. However, they likewise suffer from the limitation of not being immune to EMI.

Accordingly, there is a need in the art for a rotation sensor which is small, lightweight, immune to EMI and is accurate and reliable.

SUMMARY OF THE INVENTION

In contrast to the prior art, the present invention provides a rotation sensor which is much smaller than conventional sensors, is lightweight, is immune to EMI and which is extremely accurate and reliable. The technology utilized in the rotation sensor apparatus and method of the present invention is light reflection/refraction technology.

More specifically, the preferred embodiment of the present invention includes a first member having three light sources which are pulsed sequentially. Light from these light sources is reflected off a reflective surface connected with a second member, with the reflected light being received by an optical cable or other light receiving means. The angular position of the reflective surface relative to the light sources and the light receiving member is such that for a desired range of rotation, each angular position will result in a different light intensity being received from the light source or sources reflecting off the reflective surface. The light intensities received are dependent on the reflective and refractive characteristics of light between the light source and the receiver.

The intensity of the sequentially pulsed light signals received by the light receiving member is then converted to an electrical signal and processed. Because the intensity of the reflected light is unique for each angular position of the rotational member, a calibration file can be established and the angular orientation of the rotational member determined by measuring the intensity of the reflected/refracted light signal. Many variations can be made to alter and take advantage of reflective or refractive characteristics, such as light source positioning relative to the receiver and optical coatings.

The present invention also relates to a method of sensing rotation of a rotatable member over a desired range of rotation and includes the steps of providing a source of light, providing a reflective surface on the rotatable member and providing a light receiving member. The source of light, the reflective surface and the light receiving member are positioned relative to one another such that light from the light source is reflected off the reflected surface and received by the light receiving surface throughout the range of desired rotation. These members are also positioned, and the reflective surface shaped, such that the intensity of the reflected/refracted light is unique for each angular position throughout the range of rotation. The method also includes the steps of activating the light source and measuring the intensity of the reflected light.

Accordingly, it is an object of the present invention to provide a rotation sensor which is lightweight, extremely accurate and has the capability of providing immunity to electromagnetic interference (EMI).

Another object of the present invention is to provide a rotation sensor which utilizes light reflection techniques.

A further object of the present invention is to provide a process for sensing and measuring rotation utilizing light reflection/refraction techniques.

These and other objects of the present invention will become apparent with reference to the drawings, the description of the preferred embodiment and method, and the appended claims.

DESCRIPTION OF THE PREFERRED EMBODIMENT AND METHOD

The present invention relates to a method and apparatus for measuring rotation or angular orientation of one member both absolutely and relative to another. Throughout the application the term "rotation" or "relative rotation" and the term "angular orientation" will be used. It is intended that these are one and the same. Thus, the rotation sensor of the present invention may also be referred to as a device for measuring angular orientation or relative angular orientation.

It is intended that the rotation sensor of the present invention can be used for any application where measurement of rotation or angular movement is desired. Possible applications include, among others, aircraft control positions, aircraft door and panel positions, aircraft and launch vehicle thrust control devices, spacecraft antenna and instrument pointing, biomedical and rehabilitation applications, tachometers, robotics, automobiles and consumer products applications.

Figure 1:
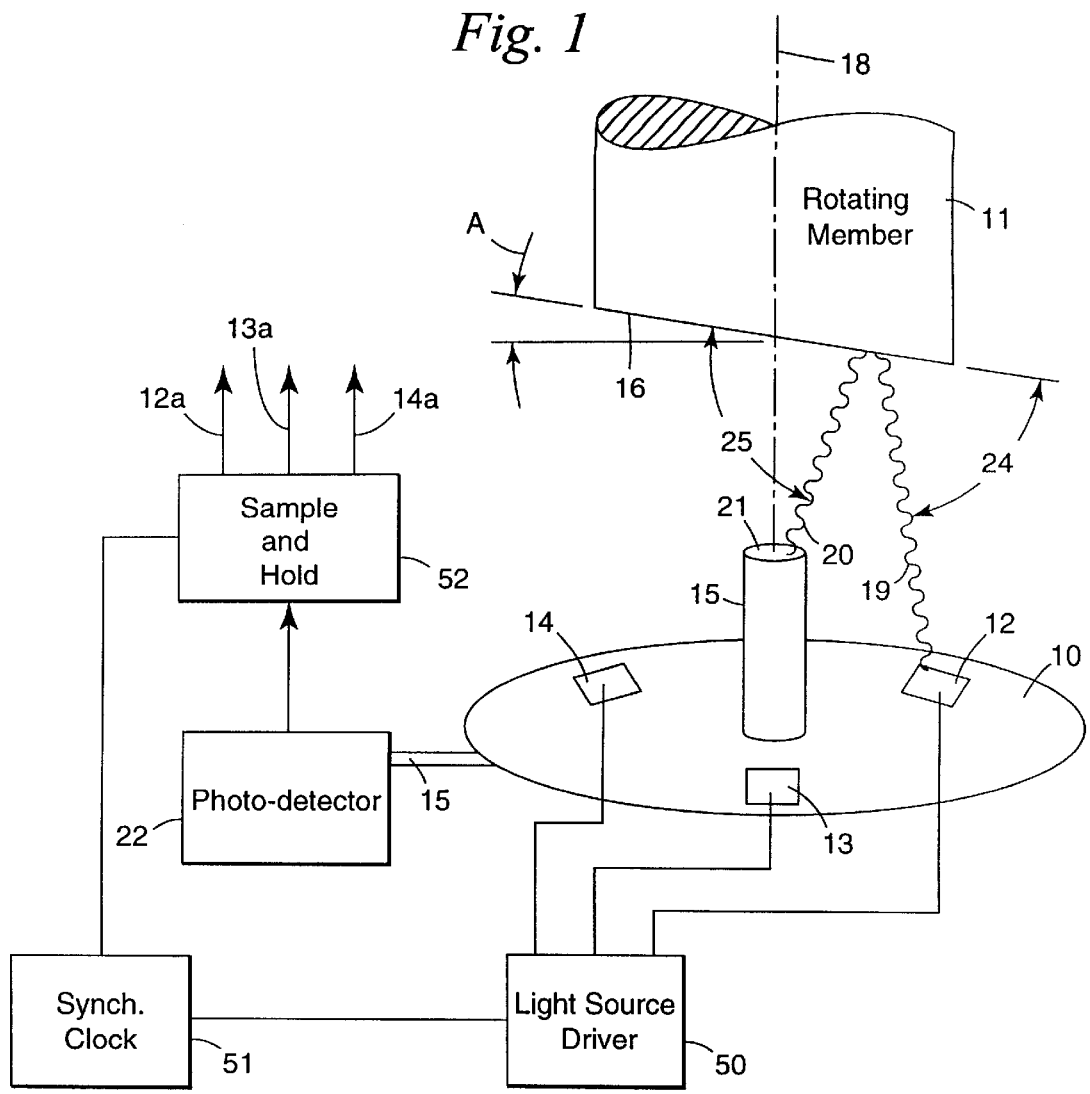
FIG. 1 is a view showing a concept of the rotation sensor of the present invention.

Reference is first made to FIG. 1 comprising an illustration of the rotation sensor of the present invention. The rotation sensor of the present invention utilizes the intensity of reflected and/or refracted light to determine the degree of rotation or relative angular orientation between a first member 10 and a second member 11. In the preferred embodiment, the first member 10 is a fixed or reference member and the second member 11 rotates relative to the first member 10.

The general concept of the present invention utilizes at least one source of light associated with the fixed member 10 which, when activated, reflects off an asymmetric reflective surface associated with the rotating member 11. This reflected light is received by a light receiving member which may also cause modulation by refraction and which ultimately measures the intensity of the reflected light signal. The intensity of this signal will depend on the angle at which the light source reflects off the reflective surface and into the light receiving member. Because the reflective surface is asymmetrical, the angles of incidence and reflection between the light source and the light receiving member will vary with the angular orientation of the rotating member 11. Thus, the light intensity signal received by the light receiving member will also vary with the angular orientation between the fixed 10 and rotating 11 members. The intensity of the reflected signal will also be altered to some extent by refraction since the reflected light will strike the light receiving member at an angle; however, alterations caused by refraction will be minimal. Then, by calibration, or otherwise by associating a particular light intensity value to a certain angular orientation, the angular orientation can be determined by measuring the light intensity signal from the reflected light.

Although the present invention is applicable for a single light source or a pair of light sources, the preferred embodiment illustrates three light sources 12, 13 and 14 associated with the fixed member 10. Any number of light sources, however, are possible. In the preferred embodiment, the light sources 12, 13 and 14 are mounted to the member 10 for convenience. It is intended, however, that the member 10 could be eliminated. In such case, the light source or light sources would be provided from a fixed or known position. In the preferred embodiment, the light sources 12, 13 and 14 are light emitting diodes (LED's), although they can also comprise other sources of light such as laser diodes, incandescent bulbs, and fluorescent lights known in the art. The light sources 12, 13 and 14 may also be polarized or non-polarized light sources.

The light sources 12, 13 and 14 in accordance with the preferred embodiment are sequentially pulsed so that only one of the light sources is activated at any one time. Technology is known to those skilled in the art for providing an appropriate activating signal to the light sources 12, 13 and 14 to provide such pulsing signal.

Also connected with the member 10 is a reflected light receiving member 15. This reflected light receiving member can be any member presently or hereinafter known in the art which is capable of receiving a reflected light signal. In the preferred embodiment, this member 15 is an optical cable commonly known as a fiber optic cable. The cable 15 has a receiving end 21 which receives a reflected light signal and transmits such light signal to a light processing means such as an optical/electrical converter or photodetector 22. The photodetector 22 functions to detect and/or measure the intensity of the light signal transmitted by the fiber optic cable 15 and to convert such signal to an electrical signal or signals which can be displayed and/or electronically processed by techniques known in the art. The optical/electrical converter (photodetector 22) could function as the receiver if properly located. This latter option, however, would not be as immune to EMI as the preferred embodiment.

The second or rotating member 11 is rotatable relative to the member 10 about an axis of rotation 18. This axis 18 does not need to be coaxial with all elements as shown in FIG. 1. The member 11 is also provided with a reflective surface 16 which is positioned on the end of the rotation member 11 and is capable of reflecting light from each of the light sources 12, 13 and 14 to the end 21 of the fiber optic cable 15. In the preferred embodiment, the reflective surface 16 is a generally planar surface positioned at an angle other than 90° relative to the axis of rotation 18. In the preferred embodiment the surface is preferably disposed such that angle "A" is less than 45°, more preferably between 5° and 25° and most preferably about 10°. One requirement of the reflecting surface 16 is that it be asymmetrical relative to a plane perpendicular to the axis of rotation 18 or that the light receiving member 15, and in particular the light receiving surface 21, be displaced or offset from the axis of rotation 18. In other words, the relationship between the light sources 12, 13 and 14, the shape and orientation of the reflective surface 16 and the position of the light receiving surface 21 must be such that the intensity of the reflected light received by the surface 21 will vary with the angular orientation of the rotating member 11 relative to the member 10.

It is also contemplated that the shape of the reflective surface 16 could be something other than planar such as a concave or convex surface; however, configurations other than planar surfaces usually require more exact location of the reflected light receiving member 15. But non-planar reflective surfaces may be helpful in configurations utilizing more light sources to obtain greater accuracy.

The operation of the rotation sensor in accordance with the present invention can be understood best as follows. During operation, the light sources 12, 13 and 14 are sequentially pulsed. The frequency of pulsing is not critical; however, it would normally be in the range of 1,000–10,000 cycles per second or 3–10 times faster than the desired sensor response time. Although some light from each of the sources 12, 13 and 14 is emitted in all directions, it is somewhat directed in that the majority is emitted in a direction perpendicular to the sensor base. One component or path of emitted light 19 is directed toward the reflected surface 16 for reflection in the form of reflected light 20 toward the light receiving surface 21 of the fiber optic cable 15. The particular angle of incidence 24 and angle of reflection 25 which is needed for light emitted from the light sources 12, 13 and 14 to be reflected off the surface 16 and received by the light receiving surface 21 will depend on the particular orientation of the reflected surface 16 relative to the light sources 12, 13 and 14.

It is also contemplated that the concept of the present invention could be utilized by providing one or more light sources on the surface 16 and sensing refraction of the light as received by the cable.

The embodiment of FIG. 1 further includes means for sequentially pulsing the light sources 12, 13 and 14. This technology is well known in the art. In the preferred embodiment, such means includes a light source driver 50 which is able to provide pulsing signals at frequencies of up to 30 KHz or more. Thus, with three light sources, each light source is pulsed at a frequency of up to 10,000 times per second or more. A synchronization clock 51 is associated with the light source driver 50 and with a sample and hold amplifier 52. The sample and hold amplifier 52 receives one electrical signal, or one set of electrical signals, 53 from the photodetector 22. However, with input from the synchronization clock 51, it is able to grab a particular electrical signal value for a particular time interval and to hold that signal for processing. Because the sample and hold amplifier 52 is controlled by the same synchronization clock as the pulsing light sources, three output signals 12*a*, 13*a* and 14*a* are generated by the sample and hold amplifier 52. These three outputs 12*a*, 13*a* and 14*a* correspond to the intensity of the reflected light from the light sources 12, 13 and 14, respectively. These signals are then compared to known angular orientations of the member 11 to prepare a calibration file. From this calibration file, the specific angular orientation of the member 11 can be determined.

Figure 3:
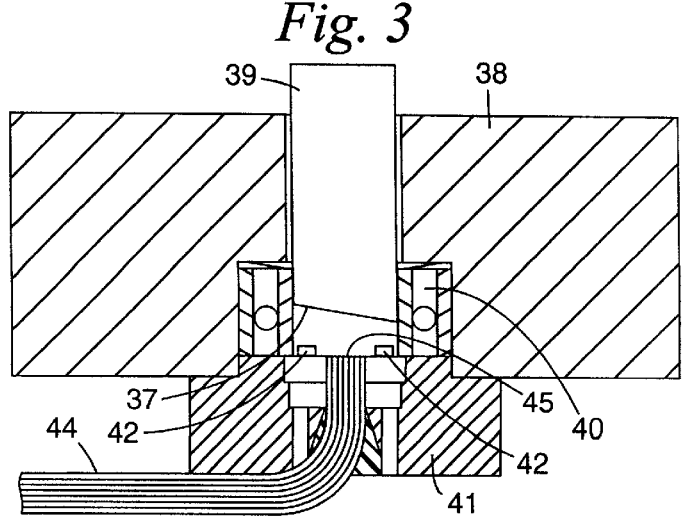
FIG. 3 is a view, partially in section, showing a self-contained unit incorporating the rotation sensor with a rotating shaft in accordance with the present invention.
Figure 2:
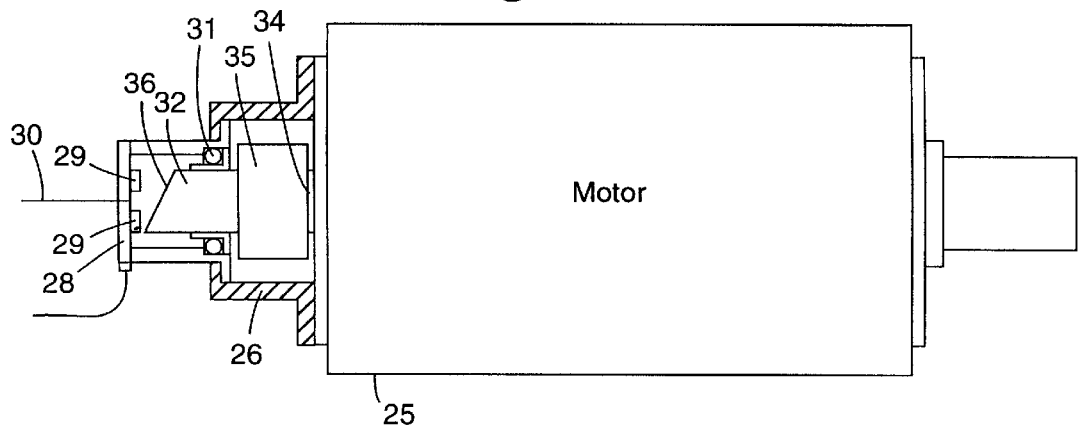
FIG. 2 is a view, partially in section, showing a design of the rotation sensor of the present invention integrated as an encoder to a motor.

FIGS. 2 and 3 illustrate applications of the rotation sensor concept illustrated in FIG. 1. FIG. 2 illustrates a sensor which is integrated as an encoder to a motor 25. The sensor includes a sensor housing 26 connected with the motor 25. The housing 26 includes a light source base 28 for supporting a plurality of light sources 29,29. Although only two light sources can be seen in FIG. 2, three light sources would normally be utilized to gain a full 360° rotation capability. The base 28 also supports a fiber optic cable 30 for directing the reflected light signals to a light intensity detector for processing. Alternatively, the light intensity detector can be positioned within the base 28 in place of the cable 30. A set of bearings 31 is associated with the housing 26 and functions to rotationally support the rotating member 32. The rotating member 32 is coupled to the motor shaft 34 by a shaft coupling 35. The rotating member 32, whose rotation or relative rotation is to be measured, is provided with an angled reflecting surface 36.

The operation of the embodiment of FIG. 2 is similar to that of the embodiment of FIG. 1. Specifically, the light sources 29 are sequentially pulsed. This provides pulsed light signals which are reflected off the reflective surface 36 and received by the fiber optic cable 30. Because of the shape and orientation of the surface 36 and its relationship to the cable 30 and the light sources 29, each rotational position provides a unique combination of light signals to be received by the cable 30. These signals are then processed as described above, thus enabling the angular orientation of the member 32 to be measured.

FIG. 3 illustrates a self-contained rotation sensor in accordance with the present invention designed for connection to any member whose relative rotation or angular orientation is desired to be measured. An example of its use would be to instrument common bearings. This embodiment includes a sensor housing 38 and a rotatable shaft 39 which is designed for connection to the member whose rotation is desired to be measured. A bearing 40 is fixed with respect to the housing 38 and designed for supporting the rotating shaft 39. Connected with the housing 38 is a substrate 41 for supporting a plurality of light sources 42,42 and a fiber optic cable 44. One end of the cable 44 is provided with a light receiving surface 45, while the other end 46 extends to a light intensity detector for measuring and processing the light intensity transmitted by the cable 44. The end of the shaft 39 adjacent the substrate 41 is provided with an angled reflecting surface 37 which functions as previously described in the embodiment of FIGS. 1 and 2 to reflect light emitted from the light sources 42,42 toward the light receiving end 45 of the cable 44.

Figure 4:
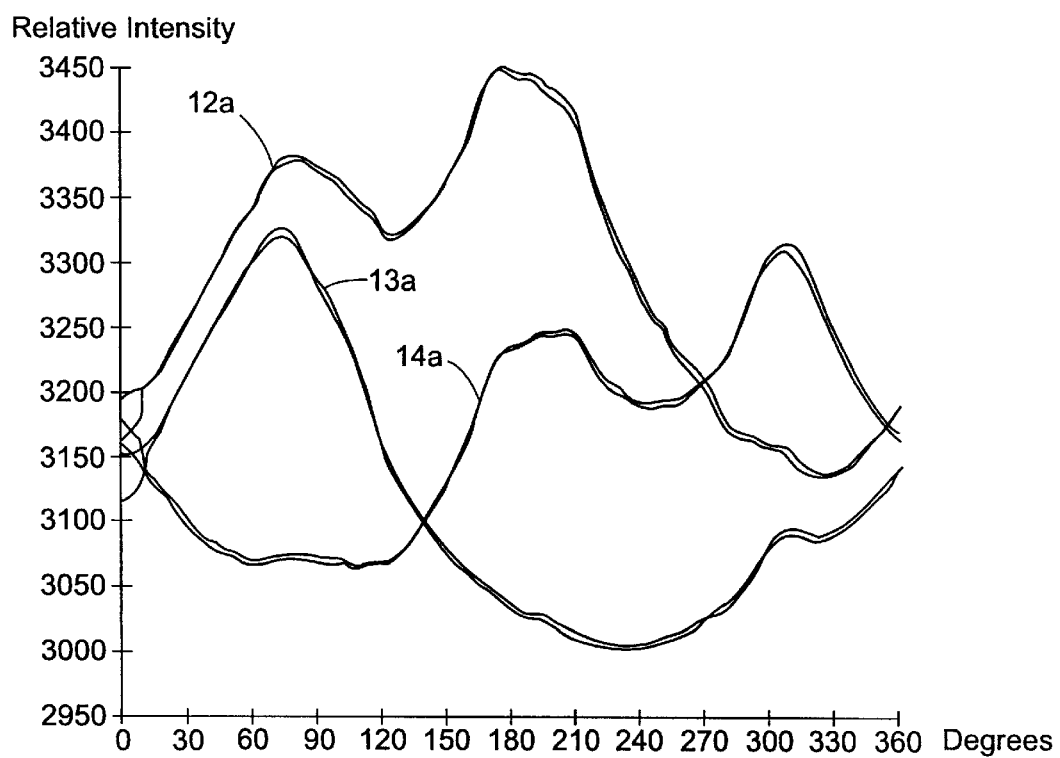
FIG. 4 is a graph plotting the reflected light intensity signals from each of the LED's of the rotation sensor against the relative rotational position of the member whose rotation is being measured.
Figure 5:
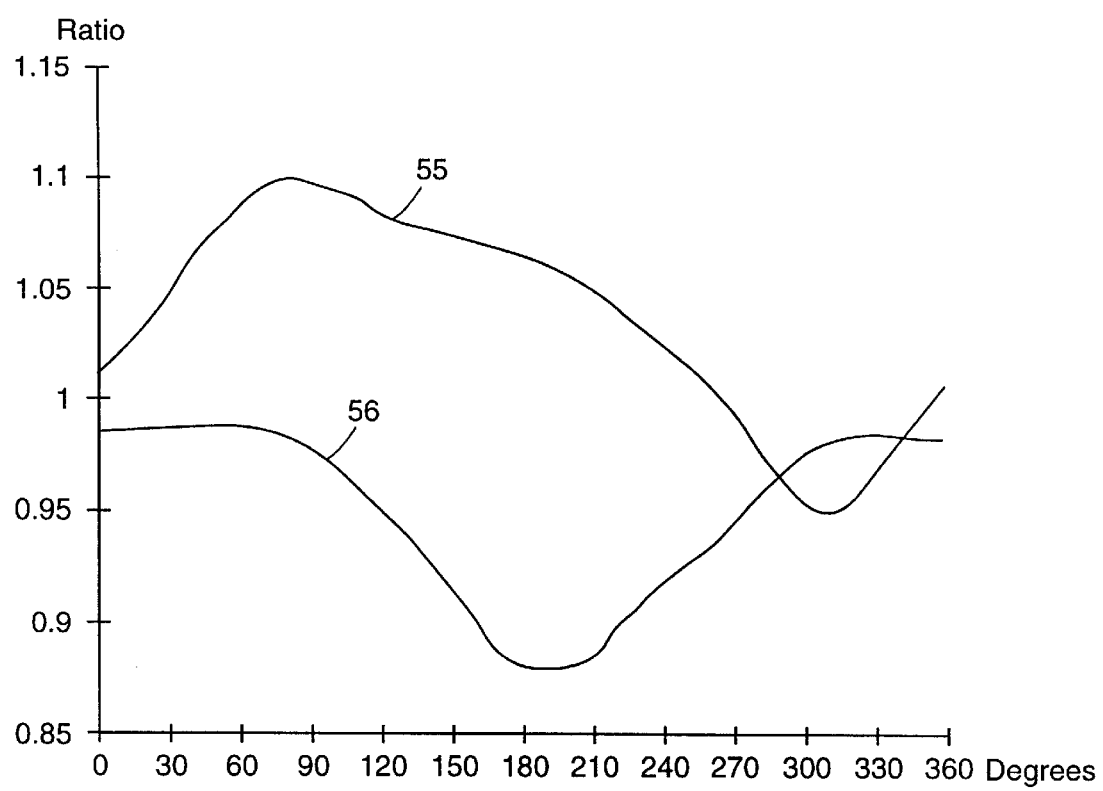
FIG. 5 is a graph plotting the ratios of certain light intensity signals relative to one another.

FIGS. 4 and 5 are various graphs showing data curves reflecting the output signals 12*a*, 13*a* and 14*a*, from the embodiment of FIG. 1 and the processing of those signals. In FIG. 4, the curves 12*a*, 13*a* and 14*a* represent the light intensity signals received by the fiber optic cable 15 over a full 360° rotation of the rotating member 11. Although each of these curves includes two or more points throughout the 360° rotation where the particular reflected light intensity is the same, the ratios of the curves is unique. FIG. 5 reflects two ratio curves 55 and 56. Ratio curve 55 reflects the ratio of curve 12*a* to curve 14*a*, while the ratio curve 56 represents the ratio of curve 13*a* to curve 12*a*. By associating the pair of ratio curves 55 and 56 to a particular known angular orientation of the rotating member, a calibration file can be established. Accordingly, by measuring the reflected light intensity of the three signals 12*a*, 13*a* and 14*a* and comparing their ratios, exact angular orientation of the rotating member can be determined.

The following is a further summary of the processing of the data and signals to determine the degree of rotation. Light is transmitted or presented to a photodetector, which converts the relative light intensity into a relative electrical signal. A varying intensity of light will then produce a varying electrical signal on the output of the photodetector. It is this electrical signal which is processed for determination of the angular position of the sensor.

The electrical signal produced from the photodetector is a result of the light produced from a given light source on the sensor. The analog electrical signal is then digitized, and corresponded to the light source. This is a continuous process in which the next sequential light source is turned on, thus producing another unique signal, which is then sampled and corresponded to that given light source.

The digital signal, which is provided by the means of an analog to digital converter, is then passed to the processing hardware in which the angle of the rotation sensor will be decoded. In the concept of the present invention, for a full 360 range of detection, three light sources are spaced about the light collector. In the preferred embodiment, these lights are spaced 120 degrees radially from the light collection location. With each of the three light sources there is a corresponding digital representation of the intensity of light that is reflected back to the light sampling location. Two unique ratios are calculated from the three signals, namely, a ratio of one of the signals to a second and a ratio of a second of the signals to a third. The reason for utilizing the ratios is to neglect any effects of fiber optic cable modulating the light signal from the sensor. Because a fiber optic cable would induce the same effects on each of the signals, by taking the ratios of the signals, any modulation induced by the fiber is cancelled. The two unique ratios are then used in a calibration method to determine the angle of rotation.

For each rotational sensor a calibration table, or equation is derived from testing. The calibration table contains the angle, in increments of desired rotational sensor accuracy, and the corresponding two ratios for that given sensor. Therefore, to calculate the angle of the sensor, the two unique ratios are compared with the table ratios, and by minimizing the error difference between measured ratios and calibration ratios, a corresponding angle of rotation is determined at the minimized error.

Although the preferred embodiment has been quite specific, it has been contemplated that various modifications could be made without deviating from the spirit of the present invention. Accordingly, it is intended that the scope of the present invention be dictated by the appended claims rather than by the description of the preferred embodiment.

We claim:

1. A rotation sensor comprising:
   a first member carrying at least one source of light;
   a second member rotatable about an axis of rotation relative to said at least one source of light;
   a light reflecting surface rotatable with said second member, said light reflecting surface comprising an axial surface portion relative to said axis of rotation and being asymmetrical relative to said axis of rotation;
   a reflected light receiving member having a light receiving surface fixed relative to said at least one source of light; and
   said at least one source of light, said light reflecting surface and said reflected light receiving member being positioned relative to one another whereby light from at least one source of light is reflected from said light reflective surface and received by said reflected light receiving member and the intensity of the reflected light received by said reflected light receiving member varies with the angular orientation of said first member relative to said second member.

2. The rotation sensor of claim 1 wherein said at least one source of light and said reflected light receiving member are mounted to said first member.

3. The rotation sensor of claim 2 wherein said reflected light receiving member includes an optical cable.

4. The rotation sensor of claim 3 including a light intensity detector connected with said optical cable.

5. The rotation sensor of claim 2 wherein said reflected light receiving member includes a light intensity detector.

6. The rotation sensor of claim 2 wherein said at least one source of light comprises a plurality of sources of light spaced from one another.

7. The rotation sensor of claim 6 wherein said plurality of sources of light comprises three sources of light.

8. The rotation sensor of claim 1 wherein said at least one source of light is a light emitting diode.

9. The rotation sensor of claim 1 including a light intensity detector and means for transmitting reflected light from said reflected light receiving member to said light intensity detector.

10. The rotation sensor of claim 1 wherein said reflected light receiving member includes a light intensity detector.

11. The rotation sensor of claim 1 wherein said first and second members are positioned relative to one another such that said axis of rotation intersects a portion of said light receiving member.

12. A rotation sensor comprising:
    at least one source of light;
    a member rotatable about an axis of rotation relative to said at least one source of light;
    a light reflecting surface rotatable with said member, said light reflecting surface comprising an axial surface portion relative to said axis of rotation and being asymmetrical relative to said axis of rotation;
    a reflected light receiving member fixed relative to said at least one source of light; and
    said at least one source of light, said light reflecting surface and said reflected light receiving member being positioned relative to one another whereby light from at least one source of light is reflected front said light reflective surface and received by said reflected light receiving member and the intensity of the reflected light received by said reflected light receiving member varies with the angular orientation of said first member relative to said second member, and wherein said at least one source of light comprises a plurality of sources of light spaced from one another.

13. The rotation sensor of claim 12 wherein said plurality of sources of light are sequentially pulsed sources of light.

14. A rotation sensor comprising:
    at least one source of light;
    a member rotatable about an axis of rotation relative to said at least one source of light said member including an axial surface portion carrying a light reflecting source;
    said light reflecting surface being rotatable with said member and being a substantially planar surface asymmetrical relative to said axis of rotation and oriented at an angle other than 90° relative to said axis of rotation;
    a reflected light receiving member fixed relative to said at least one source of light; and
    said at least one source of light, said light reflecting surface and said reflected light receiving member being positioned relative to one another such that light from at least one source of light is reflected from said light reflective surface and received by said reflected light receiving member.

15. A method of sensing rotation over a desired range of rotation between a first member and a second member rotatable relative to the first member about an axis of rotation in which said second member includes an axial surface portion, said method comprising the steps of:
    providing a source of light on said first member;
    providing a light reflecting surface on said axial surface portion of second member;
    providing a light receiving member with a light receiving surface on said first member;
    said light reflecting surface being asymmetrical relative to said axis of rotation; and
    said source of light, said reflective surface and said light receiving member being positioned relative to one another such that light from said light source is reflected off said reflective surface and received by said light receiving surface throughout said range of rotation and such that the intensity of saint reflected light is unique for each angular position between said first and second members throughout said range of rotation;

activating said light source;

measuring the intensity of said reflected light which is reflected off said reflective surface and received by said light receiving surface; and determining the relative rotation of said members from information regarding the intensity of said reflected light.

16. The method of claim 15 wherein said determining step includes calibration.

17. The method of claim 15 wherein said source of light includes at least three spaced sources of light pulsed sequentially.

18. The method of claim 15 wherein said source of light includes a plurality of light sources and wherein said method includes pulsing said plurality of light sources sequentially.

19. The method of claim 15 wherein said reflective surface is substantially planar and said axis of rotation intersects said reflective surface.

20. The method of claim 15 wherein said axis of rotation further intersects said light receiving member.

* * * * *

UNITED STATES PATENT AND TRADEMARK OFFICE
CERTIFICATE OF CORRECTION

PATENT NO. : 5,983,720  
DATED : November 16, 1999  
INVENTOR(S) : Crabb et al.

Page 1 of 1

It is certified that error appears in the above-identified patent and that said Letters Patent is hereby corrected as shown below:

Column 8,
Line 65, reads "saint" should read -- said --

Signed and Sealed this

Eighth Day of January, 2002

Attest:

JAMES E. ROGAN
*Attesting Officer*     *Director of the United States Patent and Trademark Office*